United States Patent [19]
Rail

[11] Patent Number: 5,886,883
[45] Date of Patent: Mar. 23, 1999

[54] ALTERNATIVE POWER SUPPLY SYSTEM FOR REPLACEMENT OF NICKEL-CADMIUM BATTERY PACKS

[75] Inventor: Kenneth Daniel Rail, Gainesville, Ga.

[73] Assignee: Dedicated Digital Technology, Inc., Gainesville, Ga.

[21] Appl. No.: 22,182

[22] Filed: Feb. 11, 1998

[51] Int. Cl.⁶ .............. H02J 1/02; H02M 1/12; H02K 1/02
[52] U.S. Cl. .............. 363/39; 363/45; 363/47; 307/105
[58] Field of Search .............. 363/39, 45, 46, 363/47; 307/105

[56] References Cited

U.S. PATENT DOCUMENTS

| | | | |
|---|---|---|---|
| 3,567,966 | 3/1971 | Gilbert et al. | 307/234 |
| 4,163,264 | 7/1979 | Ishii | 363/39 |
| 4,673,851 | 6/1987 | Disser | 363/41 |
| 4,694,237 | 9/1987 | Hanson | 320/6 |
| 5,076,805 | 12/1991 | Welch | 439/568 |
| 5,200,685 | 4/1993 | Sakamoto | 320/2 |
| 5,287,384 | 2/1994 | Avery | 375/1 |
| 5,304,917 | 4/1994 | Somerville | 320/32 |
| 5,350,949 | 9/1994 | Yazi | 307/150 |
| 5,386,435 | 1/1995 | Cooper et al. | 375/1 |
| 5,496,992 | 3/1996 | Madan et al. | 235/462 |
| 5,550,697 | 8/1996 | Green et al. | 363/41 |

*Primary Examiner*—Peter S. Wong
*Assistant Examiner*—Bao Q. Vu
*Attorney, Agent, or Firm*—Sanford J. Asman

[57] ABSTRACT

The alternative power system provides microprocessor grade, filtered output power capable of replacing standard NiCad battery packs in portable electronic devices. The invention makes use of capacitor banks comprised of capacitors having different values, whereby the individual capacitors act as individual filters to substantially eliminate all transients which are present in the source of power, which is typically provided by rechargeable batteries on a host system, such as a forklift or hand truck.

11 Claims, 3 Drawing Sheets

ALTERNATIVE POWER SUPPLY SYSTEM FOR REPLACEMENT OF NICKEL-CADMIUM BATTERY PACKS

BACKGROUND OF THE INVENTION

The present invention relates to an electronic circuit which may be used in conjunction with conventional storage batteries to replace nickel-cadmium (or other types of) battery packs of the type used to power numerous types of portable electronic devices. In particular, the present invention relates to an electronic circuit which can be used on "host" equipment, such as forklifts, which already have large storage batteries, to convert the "dirty" power available from those storage batteries on such "host" equipment so that it can be used to power portable electronic equipment carried thereon, where such portable electronic equipment requires a source of "clean" power.

There are many applications in which portable electronic devices are powered by rechargeable batteries, such as nickel-cadmium ("NiCad") batteries. In view of the fact that NiCad battery packs far outnumber other types of rechargeable battery packs, as used herein the term "NiCad" is intended to include all types of rechargeable battery packs. The portable electronic devices employed in many of these applications require a source of transient-free, stable power, referred to herein as "clean" power. While rechargeable NiCad batteries can be used to supply such clean power, NiCad batteries have a number of problems which are well known by those skilled in the art. In particular, they require periodic recharging in order to provide power. However, if they are recharged too often, i.e., before they have fully discharged, they experience a phenomenon referred to as "memory", with the result that they need to be recharged sooner than if they were allowed to fully discharge prior to being recharged. On the other hand, if they are allowed to fully discharge prior to being replaced or recharged, so as to minimize problems with memory, then there is a possibility that they will discharge in operation. Obviously, that is not an acceptable situation, so, in real applications, it is typically necessary to replace and recharge NiCad batteries prior to the time that they become filly discharged.

Interestingly, there are a number of applications which employ NiCad batteries for powering portable electronic devices, in which the portable electronic devices are mounted on or in vehicles or other systems which are either powered by electricity or which have on-board rechargeable storage batteries. By way of example, devices such as bar code scanners, terminals, printers (including thermal printers and dot matrix printers), RF terminals, 2-way radios, data-links, computers, calculators, and numerous other devices typically require "clean", microprocessor grade, regulated power sources, even though they are often mounted on "host" systems, such as forklifts, which are already equipped with large storage batteries which could provide adequate power, but for the fact that the power available from the batteries on such host systems is especially prone to transients which are unacceptable in the operation of the portable electronic devices.

One example of such a combination of a battery equipped "host" on which a NiCad-powered portable electronic device is mounted is a bar code scanner mounted, either permanently or semi-permanently, on a forklift or battery operated hand truck. The NiCad batteries in the scanner normally last from two to six hours (depending upon the amount of use) before they require recharging. The large storage batteries which power the host system, on the other hand, last far longer, or (in the case of some host systems) recharge in operation.

There are also other problems with NiCad batteries. In particular, even though they are expensive, their life span may be as short as 100 recharges, depending upon their application and their recharging program. Also, disposal of NiCad batteries has become a problem due to the fact that they contain materials which are considered to be toxic.

In view of the above problems with NiCad batteries, it would be desirable to be able to power portable electronic devices which are mounted on host vehicles which have sources of electricity, by those electric power sources on the host vehicles, thereby eliminating the NiCad battery packs, along with the problems and costs associated with replacing battery packs when they become discharged, disposing of battery packs when they have reached the end of their useful life, and the expense of replacement NiCad battery packs.

SUMMARY OF THE INVENTION

In accordance with the present invention, a power conditioning circuit has been developed which is able to accept, as input, a source of power which is quite "dirty", and provide an output which is clean enough to operate portable electronic equipment.

The present invention makes use of transient bypass circuitry, comprised of a plurality of capacitors, connected in parallel, in capacitor banks whereby the transients which are present in the "dirty" power sources can be safely removed in the course of converting the power for use by the portable equipment.

DETAILED DESCRIPTION OF AN EXEMPLARY EMBODIMENT

Figure 1:
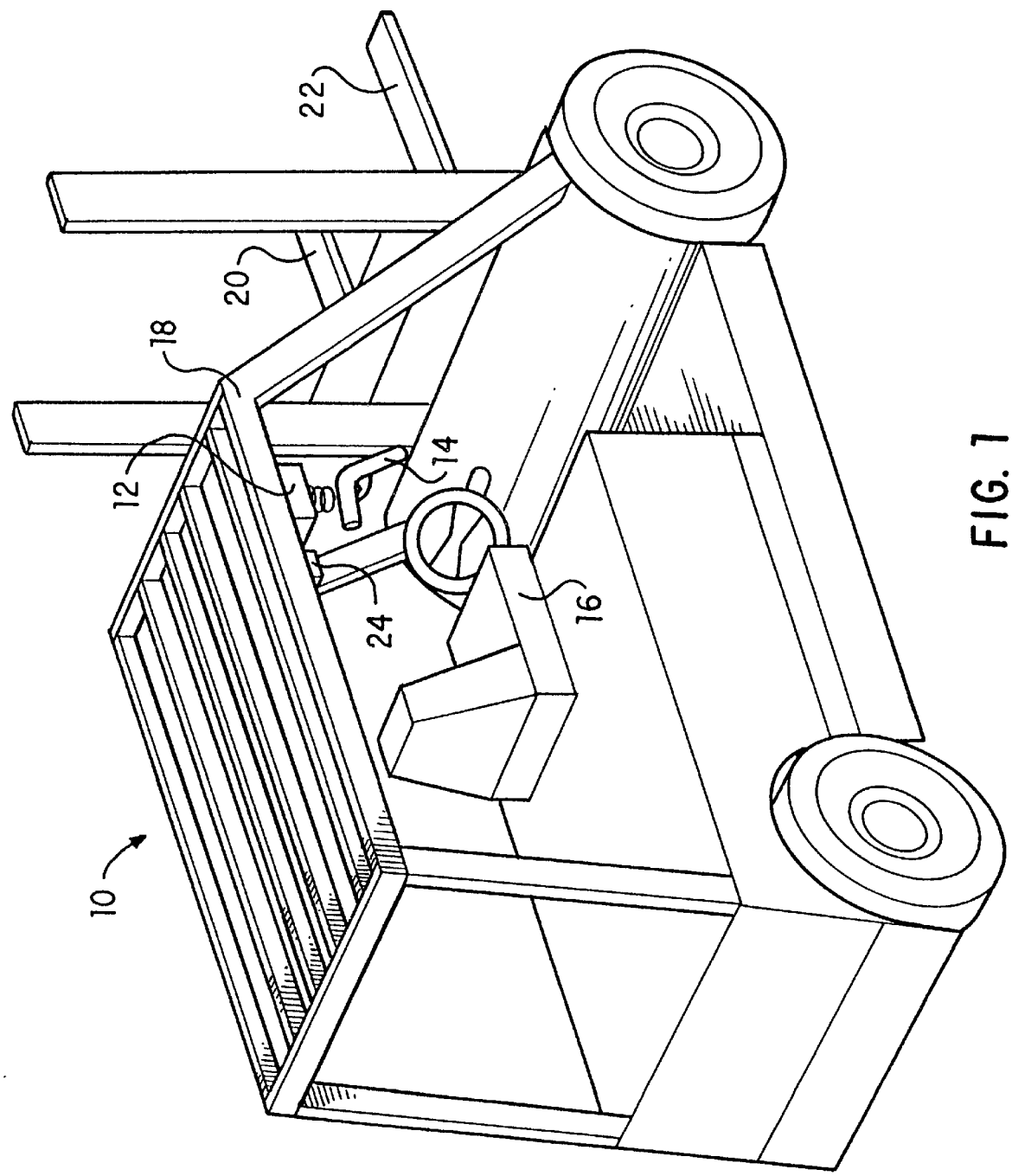
FIG. 1 is a pictorial view of a forklift having an RF terminal, powered by the alternative power system of the present invention mounted thereon.

Referring first to FIG. 1, a pictorial view of an exemplary embodiment of the present invention can be explained. In a typical warehouse inventory operation, a forklift truck 10, as shown, may be used. The forklift 10 is of the type which is adapted to move pallets of merchandise throughout a warehouse, stacking and retrieving them, as needed. In the course of such operations, it is typical to use a radio frequency ("RF") terminal unit 12, which has a bar code scanner device 14 attached thereto, to read the codes off merchandise, and to report them via an RF link in the terminal 12 to a centralized computer system which tracks inventory. The bar code scanner device 14, of the type illustrated in FIG. 1, has a typical range on the order of about twenty feet. Accordingly, in a typical warehouse operation, it is not necessary for the operator of the forklift 10 to get out of his seat 16 to move or scan merchandise. Also, due to the use of the RF terminal 12, it is not necessary for the operator to bring the forklift 10 to any central location to report inventory, or even to download it, as it is automatically reported, via the RF link in the terminal 12, each time the operator uses the scanner 14 to scan merchandise labels.

While this provides for efficient utilization of the forklift 10 and operator, a problem which leads to inefficiency is that the terminal 12 is typically powered by a standard NiCad battery pack, of the type which fits into the terminal unit 12 in the form of one or more substantially cylindrical slugs (not shown).

In a typical application, of the type described, the RF terminal 12 is mounted, either permanently or semi-permanently, on the forklift 10. As illustrated in FIG. 1, the terminal 12 is mounted on the cage 18, as shown. The problem which has heretofore existed is that the terminal 10 must be powered by a very "clean" microprocessor grade power supply. Accordingly, while the forklift 10 will typically have a large storage battery (either a gel cell or lead-acid cell battery), which either operates it (in the case of an electrically powered forklift) or which is used to power its starter motor (in the case of a gasoline or propane powered forklift), the terminal unit 12 cannot be directly powered by that battery, due the extremely high transients which are present, and which would destroy the sensitive electronic components in the terminal 12. As will be understood, there are many sources of such transients on the forklift 10, including the drive motors, which drive the forklift 10, the hydraulic motors which lift the tines 20, 22, and other equipment, such as alternators, voltage regulators, and the sounding and light devices which are used to warn of the movement of the forklift 10.

Accordingly, prior to the availability of the present invention, it was necessary for the terminal 12 to be powered by a NiCad battery or NiCad battery pack. The NiCad battery packs which normally power the terminal 12 typically require recharging after about two to six hours (depending upon the amount of use). Consequently, it is normally necessary for the operator of the forklift 10 to periodically stop warehouse operations and replace the NiCad battery pack several times in the course of a day. Typically, each battery change involves a down time on the part of the forklift 10 and its operator of about twenty minutes, during which the depleted NiCad battery pack is removed from the terminal 12 and placed into a charger unit. At the same tine, a recharged NiCad battery pack would be placed into the terminal 12. Then the operator would drive the forklift 10 back to the location of operations, and he would resume work. As there are from one to four such battery changes in the course of an eight hour shift, there can be more than an hour per shift of down time in warehouse operations (per operator) while NiCad battery packs are replaced in the terminal units. Further, as the life span of NiCad batteries can be as short as 100 recharges (depending on the application and recharging program), it is necessary to maintain a supply of NiCad battery packs to replace those which will no longer accept a charge. In addition, as the terminal 12 must be removed from the forklift 10 to replace its battery pack, there is always the possibility that an expensive terminal 12 will be dropped and damaged during the battery change operation.

With continued reference to FIG. 1, the alternative power supply 24 of the present invention is shown to be mounted on the cage 18, adjacent to the terminal unit 10. The alternative power supply 24 of the preferred embodiment is able to tap directly into the on-board battery contained on the forklift 10, and it is able to provide a fully filtered, microprocessor grade, stable output voltage which is able to provide power to the terminal unit 12, in lieu of its standard NiCad battery pack. At the same time, the voltage and current output of the system 24 fully emulates the characteristics of a NiCad battery pack, so that the terminal 12, which is powered by the output of the system 24 receives an exceptionally clean output, typically at 7.2 volts (although other voltage outputs are possible). As the actual power required by the RF terminal 12 is typically quite small, the present system 24 is able to draw power from the battery on the forklift 10 without noticeably affecting the charge of that battery.

In view of the typical availability of large rechargeable batteries on hosts such as forklifts and hand trucks, the benefits of the present invention are obvious. The RF terminal unit 12, or other portable electronic systems which are used on hosts having relatively large storage batteries are no longer constrained to using expensive NiCad batteries as long as they are mounted on electric, natural gas, or gasoline powered hosts, which have storage batteries of their own. An operator using the present invention has less downtime, because no NiCad batteries are used, so no changing of battery packs is required. The down time-per-battery factor (20 minutes or more in most cases) accumulated during changing and recharging is eliminated, and other factors, such as the risk of a forklift operator dropping an expensive bar code terminal during a battery change is eliminated.

Further, if the operator ever wants to go back to using the terminal 12 as a portable unit, without using the current invention, he needs only to reinsert the NiCad battery pack because the present invention does not require any changes to the device it powers.

Figure 2:
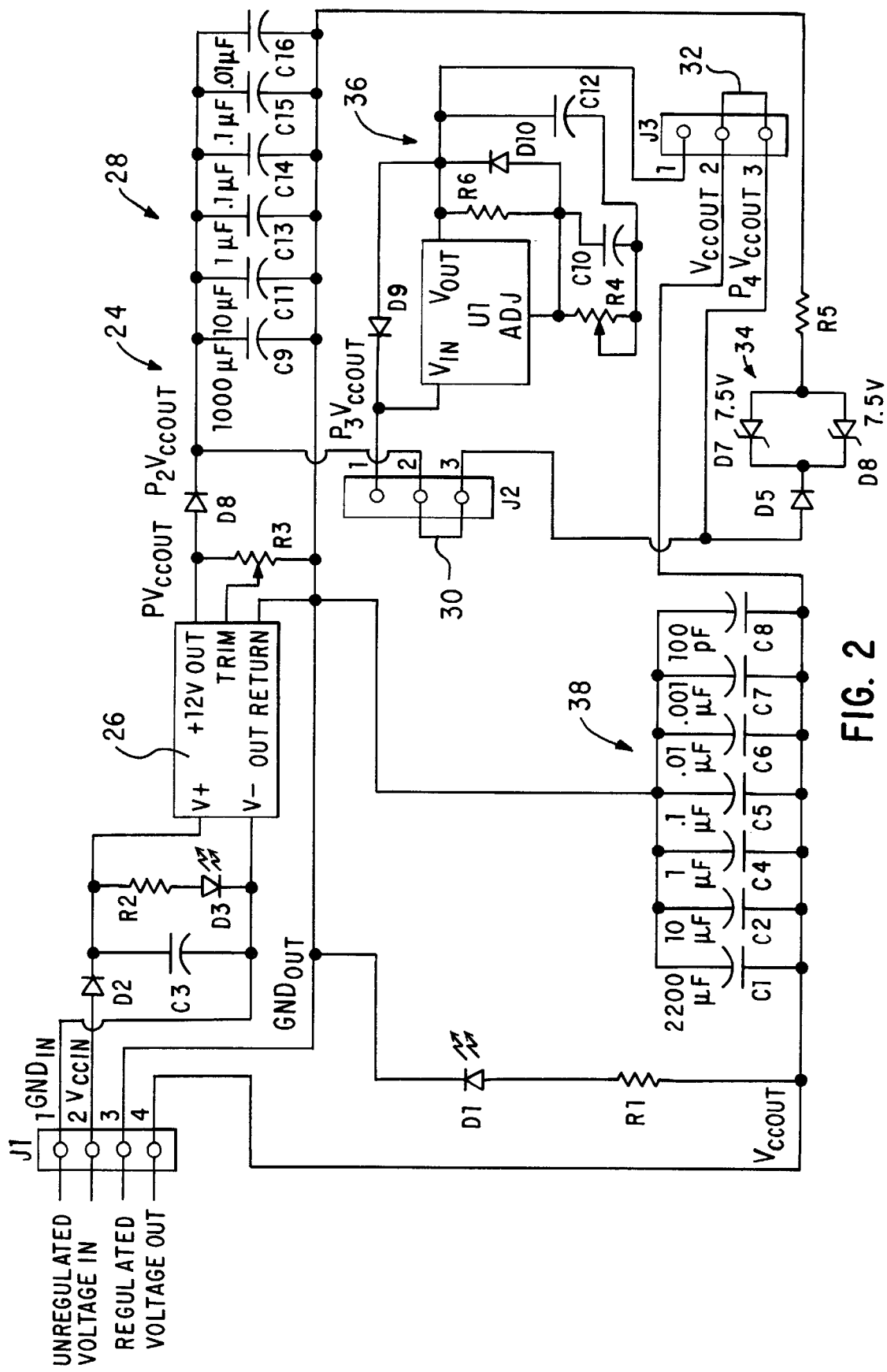
FIG. 2 is a schematic diagram of the alternative power system of the present invention.

Referring now to FIG. 2, a schematic diagram of the alternative power supply 24 of the present invention is shown. The alternative power supply 24 is comprised of an input/output connector J1, which receives power (on terminals 1 and 2) from an unregulated power source on a host system, such as the forklift 10 of FIG. 1. By way of example, the unregulated power supply may be the storage batteries located on the forklift 10. Terminal 1 of J1 is electrically connected to the negative terminal of the host's battery, and terminal 2 of J1 is connected to the positive terminal of the host's battery. A diode, D2, and a capacitor, C3, perform preliminary power conditioning, which is mainly for the purpose of smoothing out "sags" in the voltage supplied by the host system's battery. This is accomplished by virtue of the energy storage capability of the capacitor, C3, whose terminals are connected across the input of a dc-to-dc converter 26. The purpose of the dc-to-dc converter 26 is to provide a precisely trimmable, regulated output voltage $PV_{ccOut}$. A resistor, R2, and an LED, D3, are also connected across the terminals of capacitor C3, and the input terminals V+ and V− of the dc-to-dc converter 26. Their purpose is to provide a visual output, by virtue of the glowing of LED, D3, when the alternative power supply 24 is receiving power.

A variable resistor, R3, is connected between the positive and negative output terminals of the dc-to-dc converter 26. The variable resistor, R3, is used to adjust the trim voltage to the dc-to-dc converter 26, which adjusts the output voltage of the dc-to-dc converter 26. The output voltage $PV_{ccOut}$, from the dc-to-dc converter 26 is passed through a diode D8, to obtain a somewhat lower voltage (due to the diode drop in D8). That voltage is referred to as $P_2V_{ccOut}$ on the schematic of FIG. 2, and it is applied to one terminal of a first capacitor bank 28 comprised of capacitors C9, C11, C13, C14, C15, and C16. The purpose of having this first capacitor bank 28 comprised of a number of individual capacitors connected together in parallel is to allow the individual capacitors to each act as an independent filter to allow transients at frequencies associated with each of the individual capacitors to be passed to ground, thereby helping to smooth out the voltage, $P_2V_{ccOut}$, which is connected to terminal 2 of jumper J2. As shown, terminal 2 of jumper J2 is electrically connected to terminal 3 of jumper J2 by a jumper 30. Similarly, terminals 2 and 3 of jumper J3 are electrically connected together by a jumper 32.

With the foregoing jumper connections on jumpers J2 and J3, a first voltage regulator circuit 34, comprised of a dropping diode D5, a pair of zener diodes, D7 and D8, and a resistor, R5, is connected between the negative terminal of the dc-to-dc converter 26 and $P_2V_{ccOut}$. As shown, the cathode of diode D5 is connected to the cathodes of zener diodes D7 and D8, which are connected in parallel, with their anodes also connected together. The zener diodes, D7 and D8, in the preferred embodiment of the invention, have a 7.5 volt breakdown voltage. The diodes D5, D7, and D8, are connected to the $GND_{out}$ terminal of the first capacitor bank 28 through a resistor, R5, as shown.

The output voltage, $P_2V_{ccOut}$ is coarsely set by the breakdown voltage of the zener diodes D7, D8. It is then trimmed to the desired voltage using the trim resistor R3 which is connected to the TRIM terminal of the dc-to-dc converter 26. The purpose of having the pair of zener diodes, D7, D8, connected in parallel is twofold. First, this combination allows for the transmission of a larger amount of current than if only one diode was used. Second, this combination provides a significant added measure of protection to the portable electronic circuit (e.g., the terminal 12 of FIG. 1) which is powered by the alternative power supply 24, in that the failure of either of the zener diodes D7, D8 would not result in $P_2V_{ccOut}$ going high, and potentially damaging the portable electronic device. In practice. the use of the voltage regulator circuit 34 has shown to be quite effective, as it provides a very accurate output voltage for the alternative power supply 24 due to the use of the zener diodes, D7, D8. Further, as it is comprised of a very small number of components, it is relatively inexpensive to manufacture.

Notwithstanding the benefits of the fixed value voltage regulator circuit 34, the invention also includes a fully independent, second voltage regulator circuit 36, which is comprised of a Motorola LM350T voltage regulator integrated circuit in the preferred embodiment of the invention. The second voltage regulator 36 also includes a number of discrete components, including adjustment resistor R4, resistor R6, capacitors C10, C12, and diodes D9, D10, all of which are connected in a standard manner, to provide output voltage $P_3V_{ccOut}$ when the second voltage regulator 36 is used in place of the first voltage regulator 34. In order to replace the first voltage regulator 34 with the second voltage regulator 36, the jumpers 30, 32 are moved to electrically connect terminals 1 and 2 on jumpers J2 and J3. When the second voltage regulator 36 is used in place of the first voltage regulator 34, the output voltage of the alternative power supply 24 is variable over a range of about 1.2 volts to a voltage of about 36 volts thereby giving the invention the capability of powering a wide range of portable electronic devices which have widely ranging power requirements without the need to change the values of the zener diodes, D7, D8 (7.5 volts in the preferred embodiment to power 7.2 volt devices). As will be recognized by those skilled in the art, the values of the zener diodes, D7, D8, could, of course, be changed if there was a need to power portable devices having a voltage requirement other than 7.2 volts.

As the alternative power supply 24 is able to handle input voltages between about 12 volts and about 60 volts from the host system, the use of this second voltage regulator circuit 36 provides a large range of potential output voltages.

Further, it has been found that the availability of the second voltage regulator circuit 36 significantly enhances field serviceability. In the event that there is a problem with the first voltage regulator circuit 34, the second voltage regulator circuit can be placed into operation by simply moving the jumpers 30, 32, as described above.

It will be understood by those skilled in the art that only one of the voltage regulator circuits 34, 36 is used at any given time. Further, while the schematic refers to various voltages, including $P_2V_{ccOut}$ (the voltage imposed on the first capacitor bank 28), $P_3V_{ccOut}$ (the output voltage of the second voltage regulator 36), and $P_4V_{ccOut}$ (the output voltage of the first voltage regulator 34), those skilled in the art will realize that when the jumpers 30, 32 are in place the output voltage (either $P_3V_{ccOut}$ or $P_4V_{ccOut}$) of the voltage regulator in use (36 or 34) will correspond to the voltage identified as $P_2V_{ccOut}$ on the schematic, and such output voltage will be referred to as $V_{ccOut}$ (as shown at terminal 2 of jumper J3). The highly filtered, microprocessor grade output voltage, $V_{ccOut}$ is connected to the positive output terminal (terminal 4) of connector J1. Similarly, $GND_{Out}$ is connected to the ground (negative) output terminal (terminal 3) of connector J1.

As shown, the regulated output voltage, $V_{ccOut}$, is further filtered by a second capacitor bank 38, comprised of another set of parallel connected capacitors, C1, C2, C4, C5, C6, C7, and C8. Similar to the manner of operation of the first capacitor bank 28, the capacitors of the second capacitor bank 38, also each individually pass certain transient frequencies to ground better than other capacitors having different values. Consequently, the capacitors in the second capacitor bank 38 further assure that the alternative power supply 24 provides a stable, source of highly filtered electric power which can replace a standard NiCad battery pack in a portable electronic device, such as the RF terminal 10 or FIG. 1, or other portable electronic devices. Finally, the alternative power supply 24 includes a resistor, R1, and an LED, D1, which are connected in series, as shown, between $V_{ccOut}$ and $GND_{Out}$, so that D1 glows when power is available from the alternative power supply 24.

Now that the schematic diagram of the alternative power supply 24 has been fully described, several aspects of the alternative power supply 24, which are not otherwise readily apparent will be discussed. First, those skilled in the art will readily understand the concept of connecting capacitors in parallel in order to increase the overall capacitance of the connected capacitors. In such cases, the overall capacitance of such capacitors is the sum of the values of the individual capacitors. Accordingly, while it is quite common to connect capacitors together in parallel, as used herein, the purpose of the parallel connected capacitors is not to increase their overall capacitance, but to allow the individual capacitors in each of the capacitor banks 28, 38 to each, independently handle the transients which are present in discrete frequency ranges. The use of a pair of such capacitor banks 28, 38, addresses the issue of transients both before and after regulators 34, 36 handle the voltages being filtered, thereby assuring a very clean voltage supply at the output terminals 3 and 4 of the input/output terminal J1.

While the actual process by which the discrete capacitors which make up each of the capacitor banks 28, 38 is not fully understood, the use of such discrete capacitors clearly provides a superior result than would be achieved from a single capacitor having a total capacitance on the order of the sum of the capacitance of the individual capacitors. A possible explanation for this is that each individual capacitor in each of the capacitor banks is not truly an "ideal" capacitor.

Consequently, each capacitor might be more accurately modeled (for the purpose of analyzing the circuit of the present invention) as a capacitor in series with a small resistor and/or inductor. Accordingly, while the inventors do not wish to be bound by any particular theory associated with the improvement provided by their use of the capacitor banks 28, 38, as opposed to a single large capacitor, it may well be that the individual capacitors can each be modeled as a band-pass filter, which is specifically adapted to pass transient signals, within particular frequency bands, to ground, thereby removing them from the filtered output available from the alternative power supply 24.

It is to be noted, that one aspect of the capacitor banks 28, 38, which distinguish them from typical, parallel connected capacitors, which are connected that way for the purpose of obtaining a particular desired overall capacitance, is that the capacitors in the capacitor banks 28, 38 are orders of magnitude apart in value. Thus, in the first capacitor bank 28, the capacitors in the preferred embodiment of the invention range in value from 0.01 uF to 1000 uF, while the capacitors in the second capacitor bank 38 range in value from 100 pF to 2200 uF.

Figure 3:
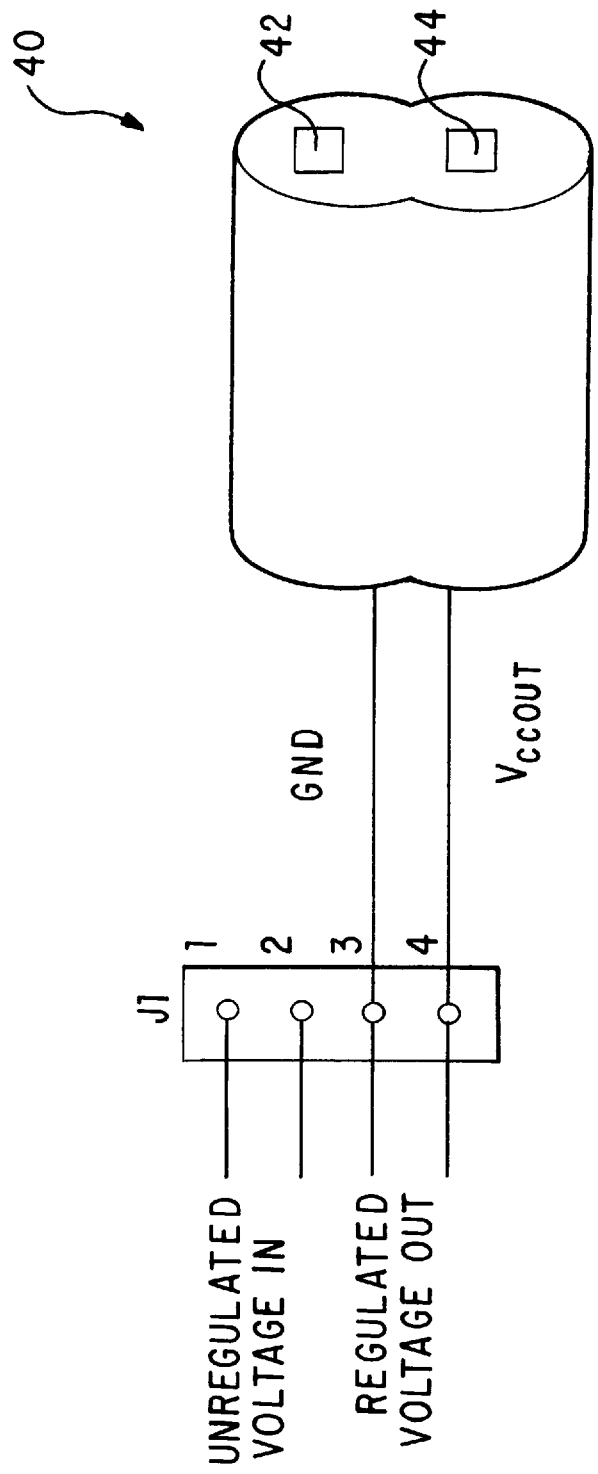
FIG. 3 illustrates a "slug" which is used with the present invention to connect it to a piece of portable electronic equipment, in lieu of a NiCad battery pack.

Referring now to FIG. 3, in the preferred embodiment of the invention, a "slug" 40 in the shape of the NiCad battery pack which is being replaced merely plugs into the battery compartment of the portable electronic device whose batteries are to be replaced. As illustrated in FIG. 3., the slug 40 includes positive and negative battery terminals 42, 44, which take the place of the NiCad battery pack terminals. The slug may be made of wood, plastic, PVC pipe, or other suitably shaped material, as its function is merely to connect to the output power terminals 1 and 2 of input/output connector J1, and to provide power to the portable electronic equipment by means of the terminals 42, 44.

While a specific, preferred embodiment of the present invention, as well as a specific, typical application for the invention have been described, those skilled in the art will recognize that numerous changes can be made without departing from the spirit or scope of the present invention.

I claim:

1. A highly regulated power supply which is particularly adapted for converting "dirty" power available from a storage battery on a host vehicle to highly regulated, "clean" power suitable for powering portable electronic devices, comprising:

(a) a pair of input terminals for receiving power from said storage battery;

(b) a first circuit for smoothing out said power received from said storage battery;

(c) a dc-to-dc converter, which receives, as its input the power from said first circuit;

(d) a first capacitor bank, used to pass transients ground, said first capacitor bank being connected to the output of said dc-to-dc converter through a diode;

(e) a voltage regulator connected across the terminals of said first capacitor bank, the output of said voltage regulator being used to accurately adjust the output voltage of said dc-to-dc converter though a trim control on said dc-to-dc converter; and (f) a second capacitor bank, connected to the output of said dc-to-dc converter and across the output terminals of said power supply, said second capacitor bank also being used to pass transients which are in the output of said dc-to-dc converter, to ground, whereby only highly filtered power is provided to the output terminals of the power supply for use by external devices.

2. The power supply of claim 1 wherein said first circuit is comprised of a diode whose anode is connected to the positive input terminal of said power supply and whose cathode is connected to a capacitor whose other terminal is connected to the negative input terminal of said power supply, the inputs to said dc-to-dc converter being connected across the terminals of said capacitor.

3. The power supply of claim 2 wherein said first capacitor bank is comprised of at least three capacitors, each of which has a capacitance value which is at least one order of magnitude different from the other two capacitors in said capacitor bank.

4. The power supply of claim 3 wherein said voltage regulator is comprised of a zener diode connected in series with a resistor and a diode.

5. The power supply of claim 4 wherein said voltage regulator includes a pair of zener diodes, each having the same value, which are connected in parallel to one another.

6. The power supply of claim 3 wherein said voltage regulator is comprised of an adjustable voltage regulator circuit which includes an integrated circuit voltage regulator device, along with an adjustable resistor which can be used to set the output voltage of said voltage regulator.

7. The power supply of claim 3, comprising:

(a) a fixed voltage regulator;

(b) an adjustable voltage regulator; and (c) selection means for determining which of said fixed voltage regulator or said adjustable voltage regulator is selected, whereby either a highly accurate, or a readily adjustable voltage regulator can be selected.

8. In combination:

(a) a host vehicle having an on-board battery;

(b) a piece of highly sensitive portable electronic equipment which cannot be powered by said on-board battery, due to the presence of transients which would damage said portable electronic equipment; and (c) a highly filtered power supply including at least one capacitor bank for removing said transients from the power supplied by said on-board battery, whereby said power supply can be powered by said on-board battery, and said portable electronic equipment can be powered by said highly filtered power supply.

9. The combination of claim 8 further comprising a slug in the shape of a rechargeable battery pack adapted to be fitted into said portable electronic equipment, said slug including contacts which are shaped and located in the positions of said rechargeable battery pack, the contacts on said slug being connected to the output terminals of said highly filtered power supply, whereby said may be placed into said portable electronic equipment, in lieu of said rechargeable battery pack, thereby providing power to said portable electronic equipment from said storage battery on said host vehicle.

10. The combination of claim 9 wherein said host vehicle is selected from the group consisting of forklifts, automobiles, trucks, boats, and aircraft.

11. The combination of claim 8 wherein said portable electronic equipment is selected from the group consisting of bar code scanners, terminals, printers, 2-way radios, RF terminals, data-links, calculators, computers, and navigation equipment.

* * * * *